United States Patent
Muramatsu

(10) Patent No.: US 8,830,509 B2
(45) Date of Patent: Sep. 9, 2014

(54) IMAGE PROCESSING APPARATUS, METHOD, AND MEDIUM FOR PERFORMING DENSITY ADJUSTMENT

(75) Inventor: Mizuki Muramatsu, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 29 days.

(21) Appl. No.: 13/477,934

(22) Filed: May 22, 2012

(65) Prior Publication Data

US 2012/0300234 A1  Nov. 29, 2012

(30) Foreign Application Priority Data

May 26, 2011   (JP) ................................. 2011-118139

(51) Int. Cl.
*G06F 3/12*   (2006.01)
(52) U.S. Cl.
USPC .............................. 358/1.15; 358/1.9; 358/1.1
(58) Field of Classification Search
USPC .......................................... 358/1.15, 1.9, 1.1
See application file for complete search history.

(56) References Cited

U.S. PATENT DOCUMENTS

2010/0321713 A1* 12/2010 Nishikawa ..................... 358/1.9

FOREIGN PATENT DOCUMENTS

JP   7-221986 A   8/1995

OTHER PUBLICATIONS

Sasanuma, Image Processing Unit, Aug. 18, 1995 , (JP 07221986 A).*

* cited by examiner

*Primary Examiner* — Benny Q Tieu
*Assistant Examiner* — Martin Mushambo
(74) *Attorney, Agent, or Firm* — Canon USA Inc. IP Division

(57) ABSTRACT

When the density adjustment is performed on a plurality of density areas by overlapping adjacent density areas with each other, output inversion may occur in the overlapped density area after the adjustment depending on an adjustment setting value. An image processing apparatus generates a correction characteristic based on adjustment values according to the plurality of density areas, corrects the correction characteristic to monotonously increase an inversion section of the correction characteristic in a case where a change in a gradation is inversed in the generated correction characteristic, and adjusts the density of image data based on the corrected correction characteristic.

7 Claims, 18 Drawing Sheets

FIG.7

| SETTING VALUE | -8 | -7 | -6 | -5 | -4 | -3 | -2 | -1 | 0 | 1 | 2 | 3 | 4 | 5 | 6 | 7 | 8 |
|---|---|---|---|---|---|---|---|---|---|---|---|---|---|---|---|---|---|
| fS | -160 | -140 | -120 | -100 | -80 | -60 | -40 | -20 | 0 | 20 | 40 | 60 | 80 | 100 | 120 | 140 | 160 |
| fM | -86 | -75 | -64 | -53 | -43 | -32 | -21 | -10 | 0 | 10 | 21 | 32 | 43 | 53 | 64 | 75 | 86 |
| fH | -140 | -122 | -105 | -87 | -70 | -52 | -35 | -17 | 0 | 17 | 35 | 52 | 70 | 87 | 105 | 122 | 140 |

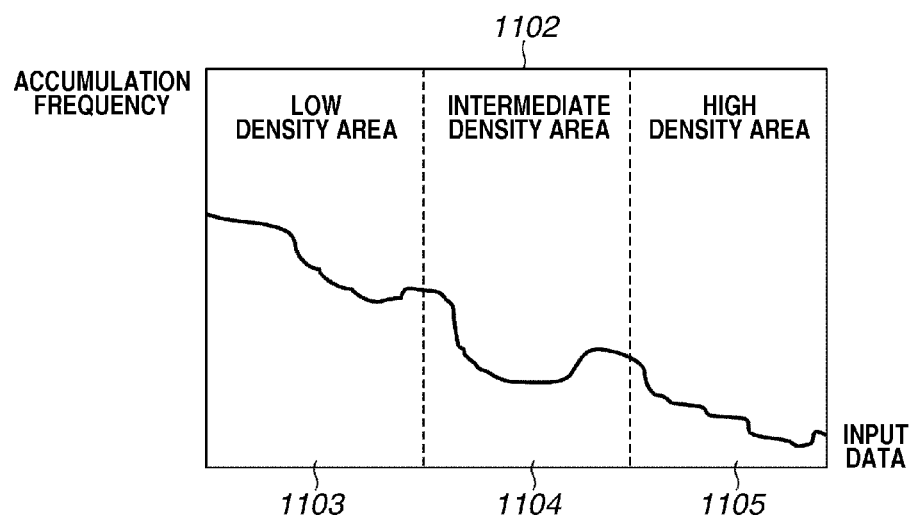

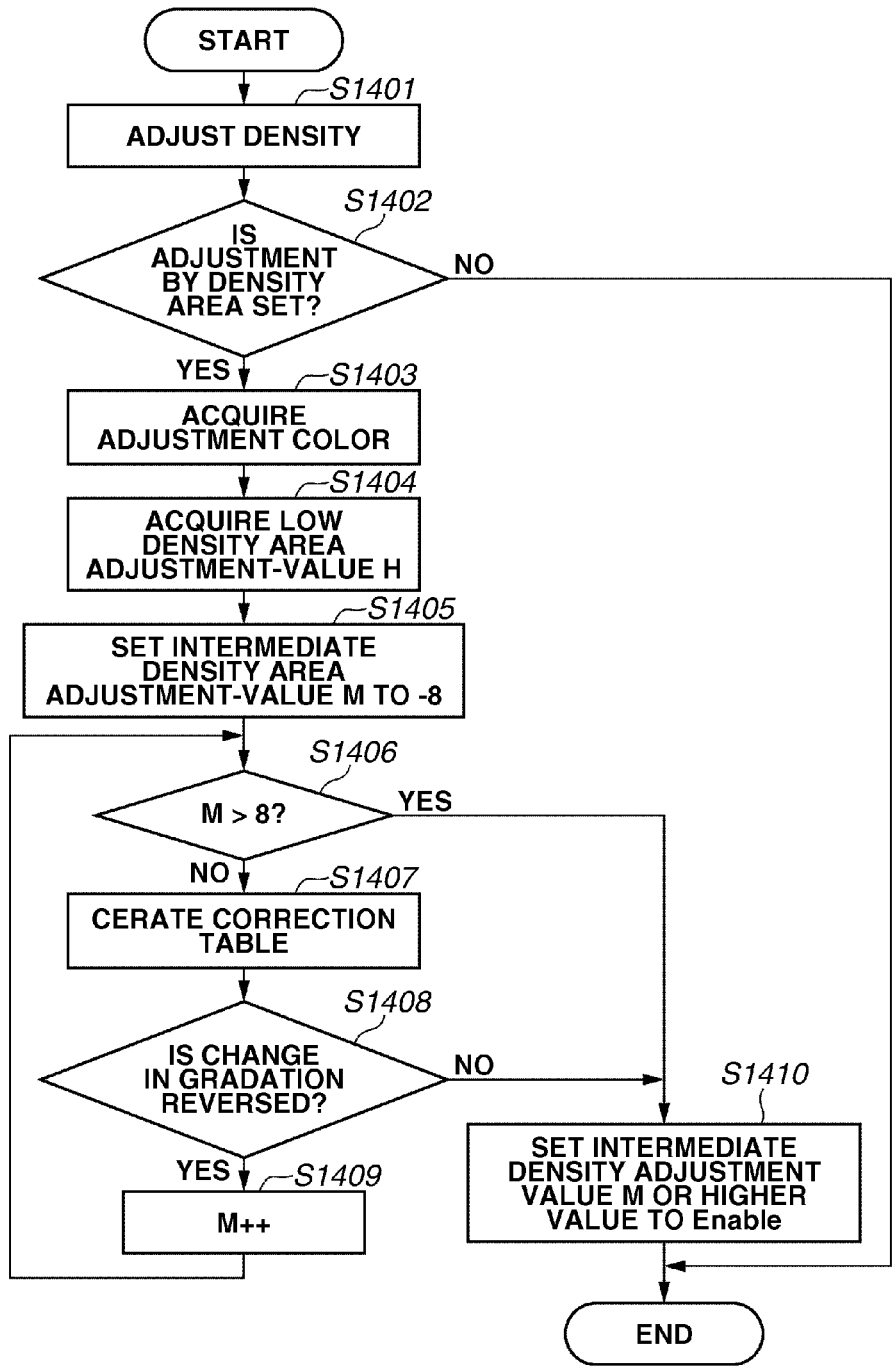

FIG.17

| SETTING VALUE | -8 | -7 | -6 | -5 | -4 | -3 | -2 | -1 | 0 | 1 | 2 | 3 | 4 | 5 | 6 | 7 | 8 |
|---|---|---|---|---|---|---|---|---|---|---|---|---|---|---|---|---|---|
| fS | -160 | -140 | -120 | -100 | -80 | -60 | -40 | -20 | 0 | 20 | 40 | 60 | 80 | 100 | 120 | 140 | 160 |
| fM | -53 | -46 | -40 | -33 | -26 | -20 | -13 | -7 | 0 | 10 | 21 | 32 | 43 | 53 | 64 | 75 | 86 |
| fH | -140 | -122 | -105 | -87 | -70 | -52 | -35 | -17 | 0 | 17 | 35 | 52 | 70 | 87 | 105 | 122 | 140 |

IMAGE PROCESSING APPARATUS, METHOD, AND MEDIUM FOR PERFORMING DENSITY ADJUSTMENT

BACKGROUND OF THE INVENTION

1. Field of the Invention

The present invention relates to an image processing apparatus capable of performing density adjustment processing on image data, an image processing method, and a medium.

2. Description of the Related Art

A density adjustment technique has been used in outputting digital data generated by a computer using a printer or a multifunction peripheral (hereinafter referred to as MFP).

Two methods are currently used as such a technique. One is a uniform adjustment in which density is adjusted by changing a tilt based on a linear characteristic for each input color signal, and the other is an independent adjustment in which density is independently adjusted by overlapping adjacent density areas with respect to a plurality of density areas (refer to Japanese Patent Application Laid-Open No. 07-221986). The density adjustment method discussed in Japanese Patent Application Laid-Open No. 07-221986 is capable of independently adjusting density for each adjacent density area and an effective means for maintaining an adjustment effect in the vicinity of the adjacent density area.

In the above conventional technique, however, density adjustment by overlapping with adjacent density areas with respect to the plurality of density areas may invert output in the overlapped density area after the adjustment depending on an adjustment setting value. Such a phenomenon can prominently occur particularly in a monochrome machine and in a single color printing.

In the conventional technique discussed in Japanese Patent Application Laid-Open No. 07-221986, the output density value is kept constant in the overlapped density area to prevent density from being inversed in the overlapped area, however, this configuration causes a problem that gradation in a target density area is degraded and deteriorates the image quality.

SUMMARY OF THE INVENTION

The present invention is directed to an image processing apparatus and an image processing method which are capable of inhibiting density from being inversed and maintaining gradation when a density adjustment is independently performed on a plurality of density areas.

According to an aspect of the present invention, an image processing apparatus capable of independently performing a density adjustment on a plurality of density areas, wherein the plurality of density areas is overlapped with an adjacent density area, includes an input unit configured to independently input an adjustment value to the plurality of density areas, a generation unit configured to generate a correction characteristic based on the adjustment values according to the plurality of density areas, a correction unit configured to correct the correction characteristic to monotonously increase an inversion section of the correction characteristic if a change in a gradation is inversed in the generated correction characteristic, and a density adjustment unit configured to perform density adjustment on image data based on the corrected correction characteristic.

According to another aspect of the present invention, an image processing apparatus capable of independently performing a density adjustment on a plurality of density areas, wherein the plurality of density areas is overlapped with an adjacent density area, includes an input unit configured to independently input an adjustment value to the plurality of density areas, wherein the input unit is limited in a setting range of an adjustment value in a second density area adjacent to a first density area based on an adjustment value according to the first density area among the plurality of density areas, and a setting range of an adjustment value in the second density area is limited so as not to cause an inversion of a change in a gradation of a correction characteristic generated based on the first and second density areas.

According to the present invention, a correction characteristic is corrected to monotonously increase a density inversion section when density adjustment is independently performed on a plurality of density areas, so that the density inversion can be inhibited and the gradation can be maintained.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 7 illustrates an example of adjustment values corresponding to the adjustment amounts by density area displayed on the operation unit.

FIGS. 11A and 11B illustrate examples of control parameters for adjusting density according to the second exemplary embodiment.

FIGS. 14A and 14B are flow charts illustrating an outline of an operation for a density adjustment according to fourth and fifth exemplary embodiments respectively.

FIG. 17 illustrates an example of adjustment values corresponding to the adjustment amount by density area displayed on the operation unit according to the fifth exemplary embodiment.

DESCRIPTION OF THE EMBODIMENTS

Various exemplary embodiments, features, and aspects of the invention will be described in detail below with reference to the drawings.

A first exemplary embodiment describes an image processing apparatus with a color scanner.

[Detail Description of Controller]

Figure 1:
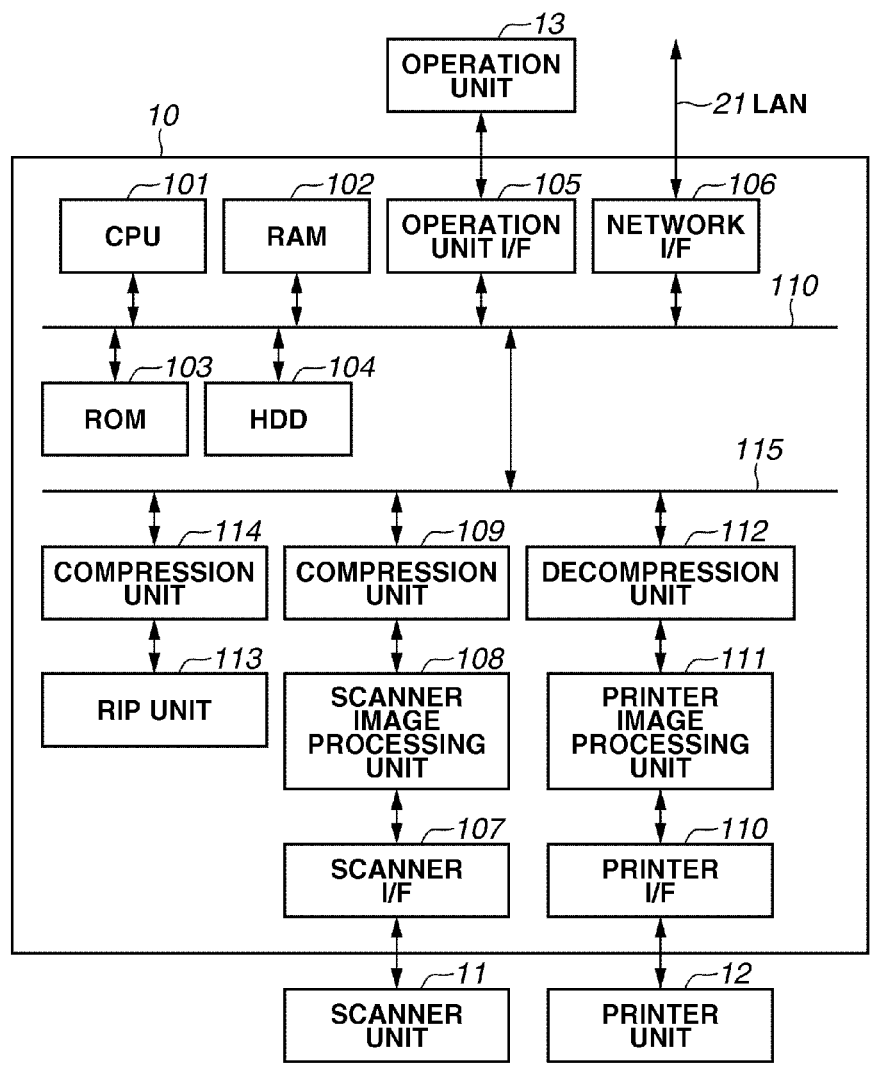
FIG. 1 is a block diagram illustrating a configuration of a controller of an image processing apparatus.

FIG. 1 is a block diagram illustrating a configuration of a controller of the image processing apparatus.

A controller 10 is electrically connected to a scanner unit 11 and a printer unit 12 and is also connected to an external apparatus via a local area network (LAN) 21. Such connections enable the controller 10 to input and output image data and device information.

A central processing unit (CPU) 101 totally controls not only access with various connected devices based on control programs stored in a read only memory (ROM) 103 but also various types of processing conducted in the controller 10.

A random access memory (RAM) 102 is a system work memory for operating the CPU 101 and temporarily storing image data. The RAM 102 includes a static random access memory (SRAM) which maintains the stored contents even after a power supply is tuned off and a dynamic random access memory (DRAM) which erases the stored contents after the power supply is turned off.

The ROM 103 stores a boot program of the apparatus or the like. A hard disc drive (HDD) 104 can store system software and image data.

An operation unit interface (I/F) 105 is an interface for connecting between a system bus 110 and an operation unit 13. The operation unit I/F 105 receives image data to be displayed on the operation unit 13 from the system bus 110 and outputs the image data to the operation unit 13 and information input from the operation unit 13 to the system bus 110.

A network I/F 106 is connected to the LAN 21 and the system bus 110 to input and output information. An image bus is a transmission path transferring image data and includes a peripheral component interconnect (PCI) bus or a bus based on Institute of Electrical and Electronics Engineers (IEEE) 1394.

A scanner image processing unit 108 performs correction, processing, and editing on the image data received from the scanner unit 11 via a scanner I/F 107. The scanner image processing unit 108 determines whether the received image data is a color or monochrome document, or a text or photograph document. Then, the image data is accompanied by the determination result. Such accompanying information is referred to as attribute data.

Compression units 109 and 114 receive the image data and divide the image data into blocks each composed of 32 pixels×32 pixels. The image data of 32 pixels×32 pixels is referred to as tile data. An area corresponding to the tile data in a document (a paper medium yet to be read) is referred to as a tile image. Average luminance information in the block of 32 pixels×32 pixels and a coordinate position of the tile image on the document are added to the tile data as header information. The compression unit 109 compresses the image data composed of a plurality of the tile data pieces. A decompression unit 112 decompresses the image data composed of the plurality of the tile data pieces, then rasterizes the decompressed image data, and transmits the image data to a printer image processing unit 111.

The printer image processing unit 111 receives the image data transmitted from the decompression unit 112 and subjects the image data to image processing while referencing the attribute data by which the image data is accompanied. The image data subjected to the image processing is output to the printer unit 12 via a printer I/F 110. Detailed processing performed in the printer image processing unit 111 is described below.

A raster image processor (RIP) unit 113 receives intermediate data which is generated based on page description language (PDL) code data transmitted from a personal computer (PC) and generates bitmap data (multi-value). Detailed processing performed in the RIP unit 113 is described below.

[Detailed Description of RIP Unit 113]

Figure 2:
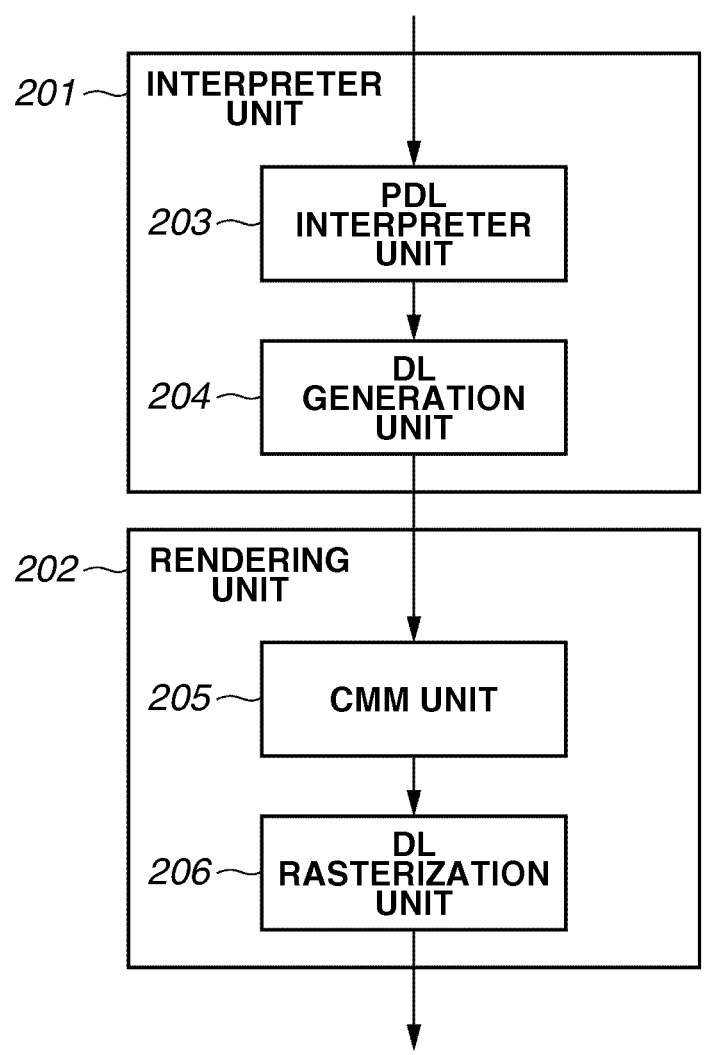
FIG. 2 is a block diagram illustrating an internal configuration of a raster image processor (RIP) unit.

FIG. 2 illustrates the internal configuration of the RIP unit 113.

The RIP performs processing of simultaneously reproducing vector information of characters, line drawings, and graphics described in the PDL or image scanning line information of colors, patterns, and photographs on a page.

In other words, the RIP is a processor which rasterizes each object information into a bitmap (a raster image) on a memory. Formerly, the RIP has been mounted on an output apparatus as hardware, however, at present, the RIP is realized by software by increasing the speed of the CPU.

The RIP unit 113 is generally formed of an interpreter unit 201 and a rendering unit 202.

The interpreter unit 201 includes a PDL interpreter unit 203 for interpreting a PDL and a display list (DL) generation unit 204 for generating an intermediate file referred to as a display list from the interpreted PDL data.

The rendering unit 202 is formed of a color matching module (CMM) unit 205 for executing color matching for the display list and a DL rasterization unit 206 for rasterizing the display list into bitmap (a raster image).

The PDL interpreter unit 203 interprets various types of input PDL data. PostScript (registered trademark) language of Adobe Systems and Printer Control Language (PCL) language of Hewlett Packard (HP) are famous as an input format. These input formats are described in printer control codes for generating images in units of pages and include simple character codes, picture description codes, and photo image codes. A document displaying file format of Portable Document Format (PDF) developed by Adobe Systems has been frequently used in various industries. The PDL interpreter unit 203 can handle the PDF format directly loaded onto the MFP without the use of a driver as a target input format. In addition, the PDL interpreter unit 203 can handle a format for Variable Data Print (VDP) referred to as Personalized Print Markup Language (PPML). Furthermore, the PDL interpreter unit 203 can handle a color image compression format referred to as Joint Photographic Experts Group (JPEG) and Tagged Image File Format (TIFF).

The CMM unit 205 can receive various types of image data such as gray scale; red, green, and blue (RGB); and cyan, magenta, yellow, and black (CMYK). The CMM unit 205 performs color matching processing by interpolation processing using look-up table (LUT) information written in the International Color Consortium (ICC) profile.

[Detailed Description of Printer Image Processing Unit 111]

Figure 3:
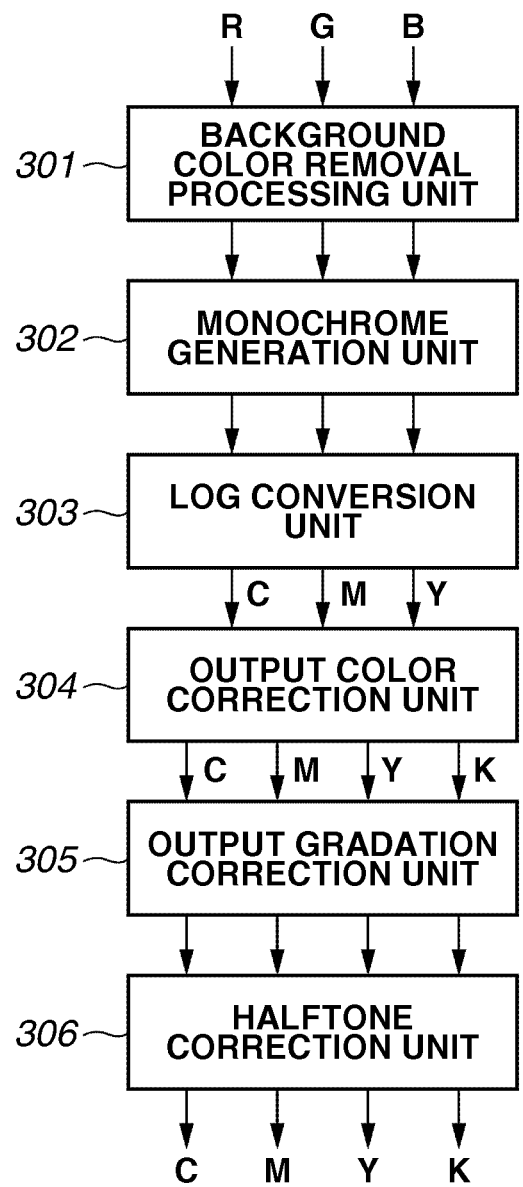
FIG. 3 is a block diagram illustrating an internal configuration of a printer image processing unit.

FIG. 3 illustrates the internal configuration of the printer image processing unit 111.

A background color removal processing unit 301 removes a background color of image data using a histogram generated by the scanner image processing unit 108.

A monochrome generation unit 302 converts color data into monochrome data. A log conversion unit 303 performs luminance density conversion. The log conversion unit 303 converts the input RGB image data into CMY image data, for example.

An output color correction unit 304 corrects an output color. For example, the output color correction unit 304 converts the input CMY image data into CMYK image data using a table or a matrix.

An output gradation correction unit 305 independently performs density adjustment processing on a plurality of density areas which are instructed by the operation unit 13 in FIG. 1 to be input with respect to the signal value input to the output gradation correction unit 305. The output gradation correction unit 305 is described in detail below.

A halftone correction unit 306 performs halftone processing in accordance with the number of gradations of the printer unit 12 for output. For example, the halftone correction unit 306 performs binarization processing or 32-valuing processing on the received image data high in gradation.

The various processing unit, such as the scanner image processing unit 108 and the printer image processing unit 111, can output the received image data without subjecting the data to the relevant processing. Causing the data to pass through a certain processing unit in this manner is referred to as "passing through a processing unit."

[Detailed Operation of Output Gradation Correction Unit 305]

The operation of the output gradation correction unit 305, which is characteristic of the present invention, is described in detail below. In the present exemplary embodiment, a plurality of density areas in a monochrome machine and a single color printing is subjected to density adjustment.

A correction table generated in this operation is stored in the HDD 104 and used in the output gradation correction unit 305 of the printer image processing unit 111.

The following is described on the assumption that a modulation amount and adjustment values fH, fM, and fS in each density area are stored in the HDD 104.

Figure 4:
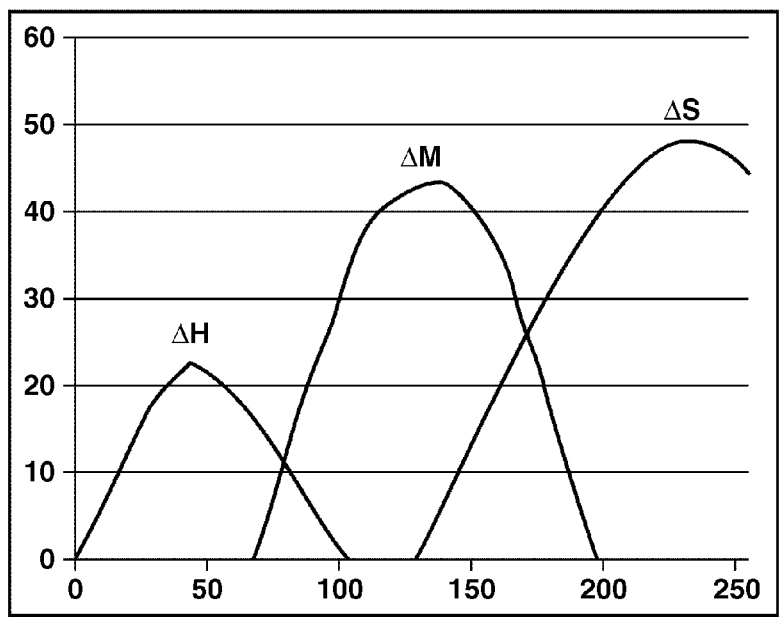
FIG. 4 illustrates an example of a modulation amount in a first exemplary embodiment.

FIG. 4 illustrates a modulation amount for each density area in the present exemplary embodiment. An abscissa axis and an ordinate axis represent a level of an input image signal and a modulation amount respectively. The density area of the density signal is divided into three density areas: levels 0 to 104 as a low density area H; levels 67 to 199 as an intermediate density area M; and levels 128 to 255 as a high density area S. Values ΔH, ΔM, and ΔS in FIG. 4 represent the maximum value of the modulation amount in each density area. The values ΔH, ΔM, and ΔS are taken as 23, 44, and 48 respectively.

Figure 5:
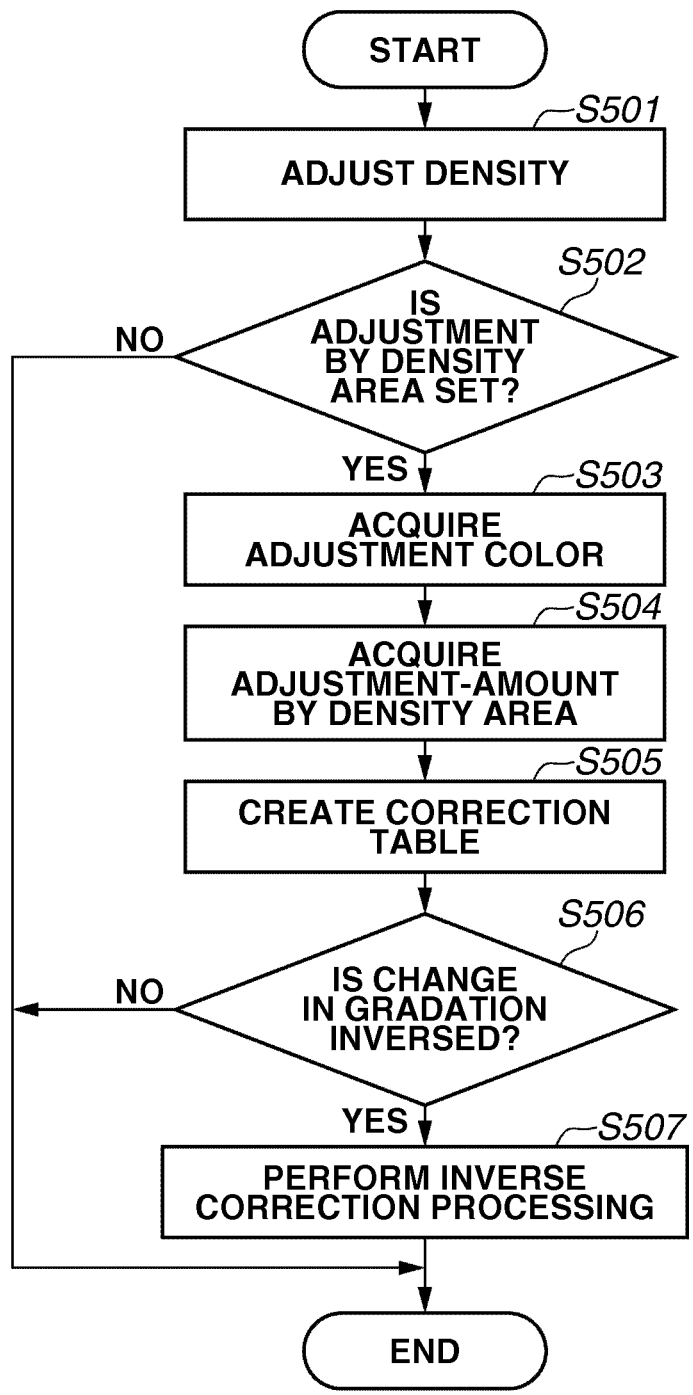
FIG. 5 is a flow chart illustrating an outline of an operation for a density adjustment according to the first exemplary embodiment.

FIG. 5 illustrates the outline of the operation for the density adjustment. A control program for realizing the processing illustrated in FIG. 5 is stored in the ROM 103 as described above. Loading the control program stored in the ROM 103 on the RAM 102 and the CPU 101 executing the loaded program execute the processing illustrated in the flow chart in FIG. 5.

In step S501, a density adjustment menu is selected in the operation unit 13. In step S502, the CPU 101 determines whether an adjustment by density area is set. If the CPU 101 determines that the adjustment by density area is set (YES in step S502), in step S503, an adjustment color set by the operation unit 13 is acquired.

In step S504, an adjustment amount (adjustment degree) by density area set by a user using the operation unit 13 is acquired.

In step S505, a correction table (correction characteristics) is generated by multiplying adjustment values fH, fM, and fS corresponding to the adjustment amount by density area acquired in step S504 by the modulation amounts ΔH, ΔM, and ΔS illustrated in FIG. 4. More specifically, the correction table is generated by calculating an output value "Out" with respect to each input value "In" using the following equation.

$$\text{Out} = \text{In} + (\Delta S(\text{In}) \times fS + \Delta M(\text{In}) \times fM + \Delta H(\text{In}) \times fH)/100 \quad (1)$$

In step S506, the CPU 101 determines whether the correction table generated in step S505 includes an inversion in a gradation change. If the CPU 101 determines that the correction table includes data inversion (YES in step S506), then in step S507, inversion correction processing is performed and the processing is ended.

On the other hand, if the CPU 101 determines that the correction table does not includes the data inversion (NO in step S506), the processing is ended. If the CPU 101 determines that the adjustment by density area is not set (NO in step S502), the processing is also ended.

Figure 6:
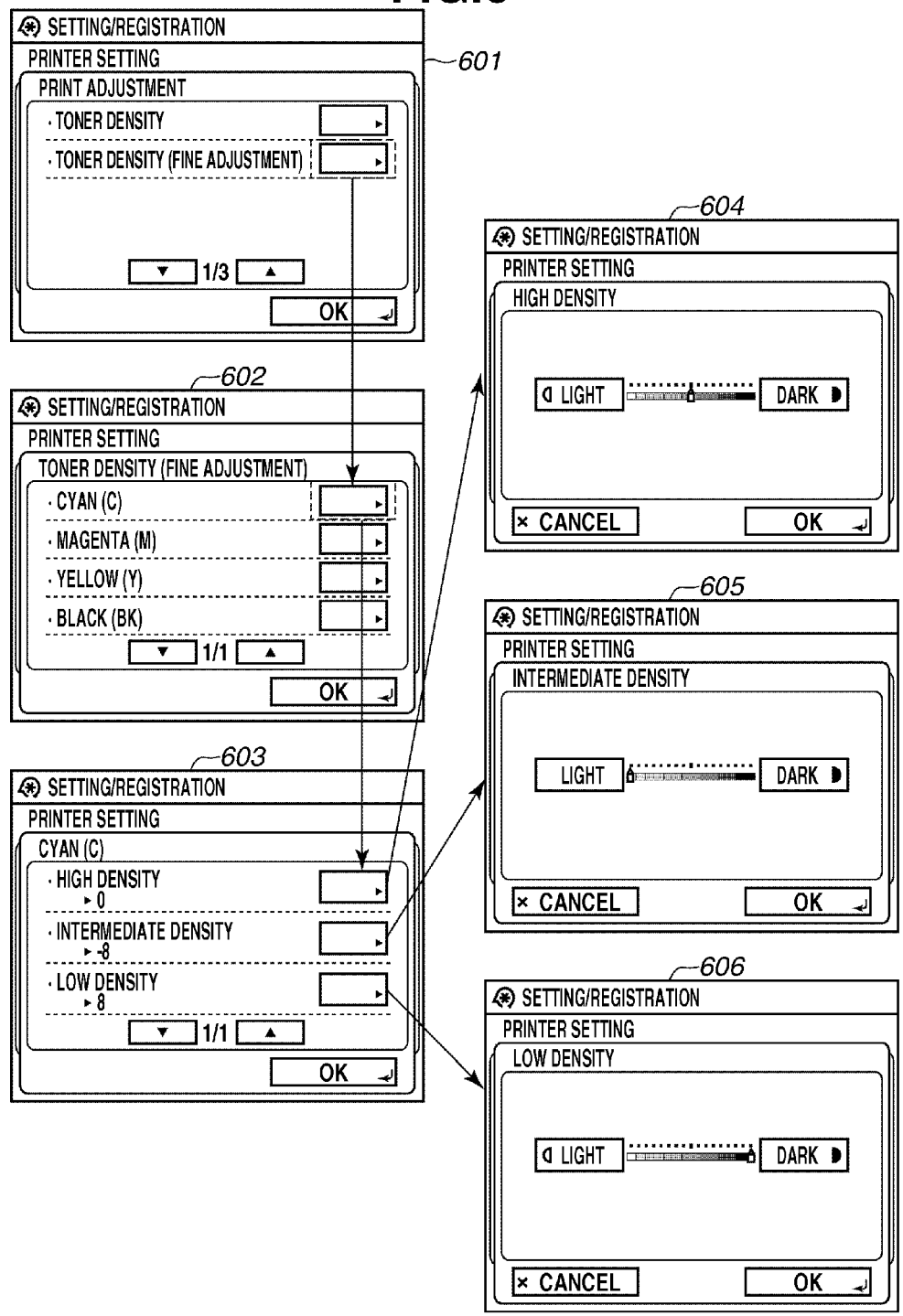
FIG. 6 is an example in which an adjustment amount by density area is set on an operation unit.

FIG. 6 is a schematic diagram illustrating an example of the adjustment amount by density area on the operation unit 13.

FIG. 6 illustrates a density adjustment menu setting screen 601 in step S501 in FIG. 5, an adjustment setting screen by density area 602 in step S502 in FIG. 5, and an adjustment color acquisition screen 603 in step S503 in FIG. 5. Screens 604 and 606 are used for acquiring an adjustment amount by density area.

FIG. 7 is a table illustrating a relationship between the adjustment amount by density area displayed on the operation unit 13 and the adjustment values fH, fM, and fS corresponding thereto. For example, if the adjustment amount by density area set in FIG. 6 is +8 in a low density H, −8 in an intermediate density M, and ±0 in a high density S, the adjustment values fH, fM, and fS are set to 140, −86, and 0 respectively as illustrated in FIG. 7.

[Detailed Operation of Inversion correction Processing]

Figure 8:
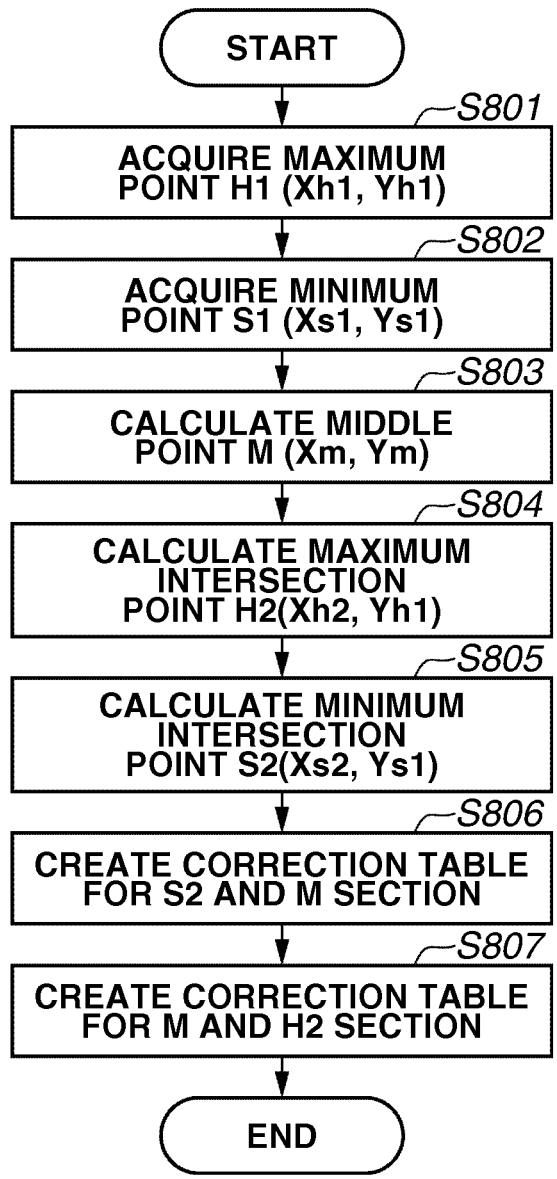
FIG. 8 is a flow chart illustrating an outline of an operation for inversion correction processing according to the first exemplary embodiment.

FIG. 8 is a flow chart illustrating the outline of the operation for inversion correction processing in step S507 in FIG. 5. The control program realizing the processing illustrated in FIG. 8 is stored in the ROM 103 as described above. Loading the control program stored in the ROM 103 on the RAM 102 and the CPU 101 executing the loaded program execute the processing illustrated in the flow chart in FIG. 8.

Figure 9:
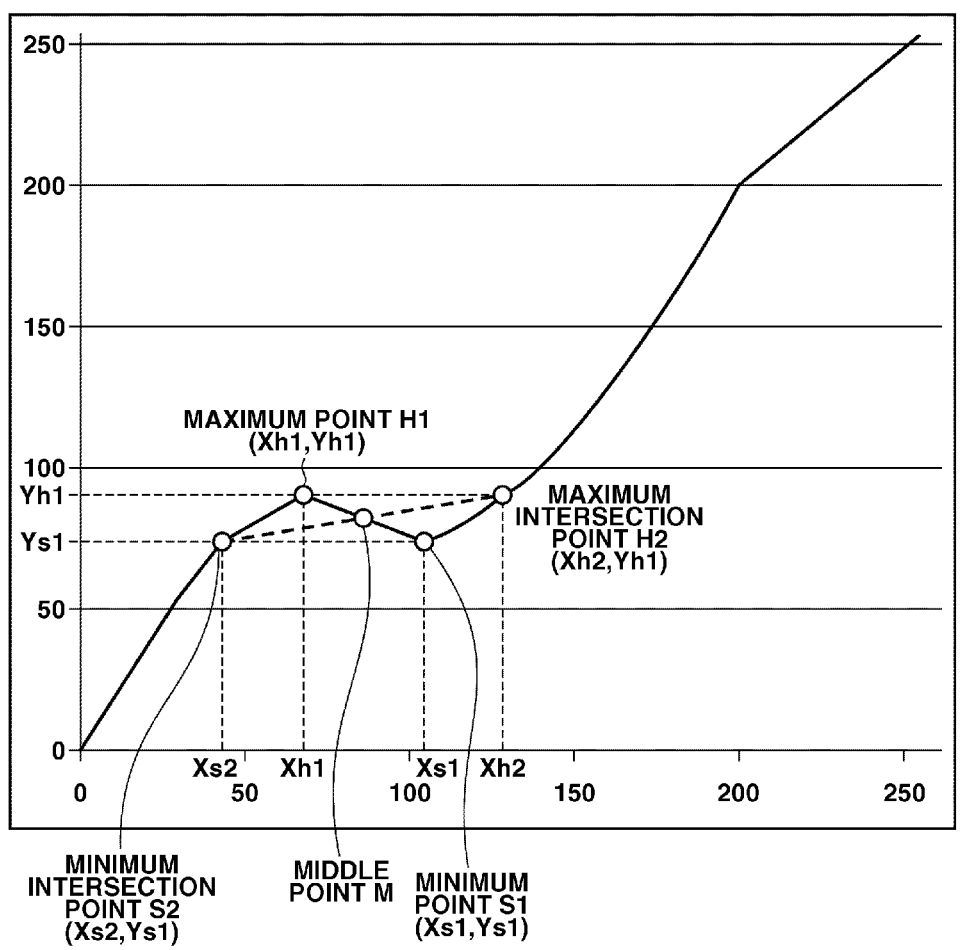
FIG. 9 is an example of a correction table generated by performing the inversion correction processing according to the first exemplary embodiment.

FIG. 9 illustrates a correction table generated in a case where the adjustment amount by density area set in FIG. 6 is +8 in the low density H, −8 in the intermediate density M, and ±0 in the high density S.

The operation is described using the correction table in FIG. 9 as an example.

In step S801, a maximum point H1 (Xh1, Yh1) in the correction table generated in step S505 in FIG. 5 is acquired. In step S802, a minimum point S1 (Xs1, Ys1) in the correction table is acquired. In step S803, a middle point M (Xm, Ym) is calculated by the following equation.

$$Xm = (Xs1 - Xh1)/2 + Xh1 \quad (2)$$

$$Ym = (Yh1 - Ys1)/2 + Ys1 \quad (3)$$

In step S804, a maximum intersection point H2 (Xh2, Yh1) indicating the same output value as the maximum point H1

(Xh1, Yh1) is calculated. In step S805, a minimum intersection point S2 (Xs2, Ys1) indicating the same output value as the minimum point S1 (Xs1, Ys1) is calculated. The maximum point H1 and the maximum intersection point H2 have the same value on the Y coordinate. The minimum point S1 and the minimum intersection point S2 have the same value on the Y coordinate. The maximum intersection point H2 and the minimum intersection point S2 are on the correction table (correction characteristics).

Then in step S806, a correction table for the section area of the minimum intersection point S2 (Xs2, Ys1) and the middle point M (Xm, Ym) is generated using the following equation, where Xin is an input signal value in the correction table, and Yout is an output signal value in the correction table.

$$Yout = Ys1 + (Xin - Xs2) \times (Ym - Ys1)/(Xm - Xs2) \quad (4)$$

In step S807, a correction table for the section area of the middle point M (Xm, Ym) and the maximum intersection point H2 (Xh2, Yh1) is generated using the following equation. Then, the processing is ended.

$$Yout = Ym + (Xin - Xm) \times (Yh1 - Ym)/(Xh2 - Xm) \quad (5)$$

According to the above operation, the correction table from the maximum point intersection point S2 to the maximum intersection point H2 is generated as indicated by a broken line in FIG. 9. In other words, the correction table (correction characteristics) is corrected so that the inversion section from the minimum intersection point S2 to the maximum intersection point H2 is monotonously increased.

The present processing can inhibit the density inversion and maintain the gradation by performing density adjustment in consideration of the gradation using the interpolation calculation of the density inversion area when independently performing the density adjustment processing on a plurality of density areas of input digital image data.

In the first exemplary embodiment, the interpolation calculation processing of the density inversion area is executed in performing the density adjustment processing.

A second exemplary embodiment describes in detail a method for correcting an adjacent density area in performing the density adjustment processing in a case where a determination is made based on the accumulation frequency of input data.

The processing similar to that in the first exemplary embodiment is given the same reference characters and numerals to omit the description thereof. The following is described on the assumption that a parameter, a low density accumulation determination threshold ThH, and an intermediate density accumulation determination threshold ThM in the method for correcting an adjacent density area are stored in the HDD 104. In the present exemplary embodiment, the low density accumulation determination threshold ThH and the intermediate density accumulation determination threshold ThM are taken as 85 and 164 respectively.

Figure 10:
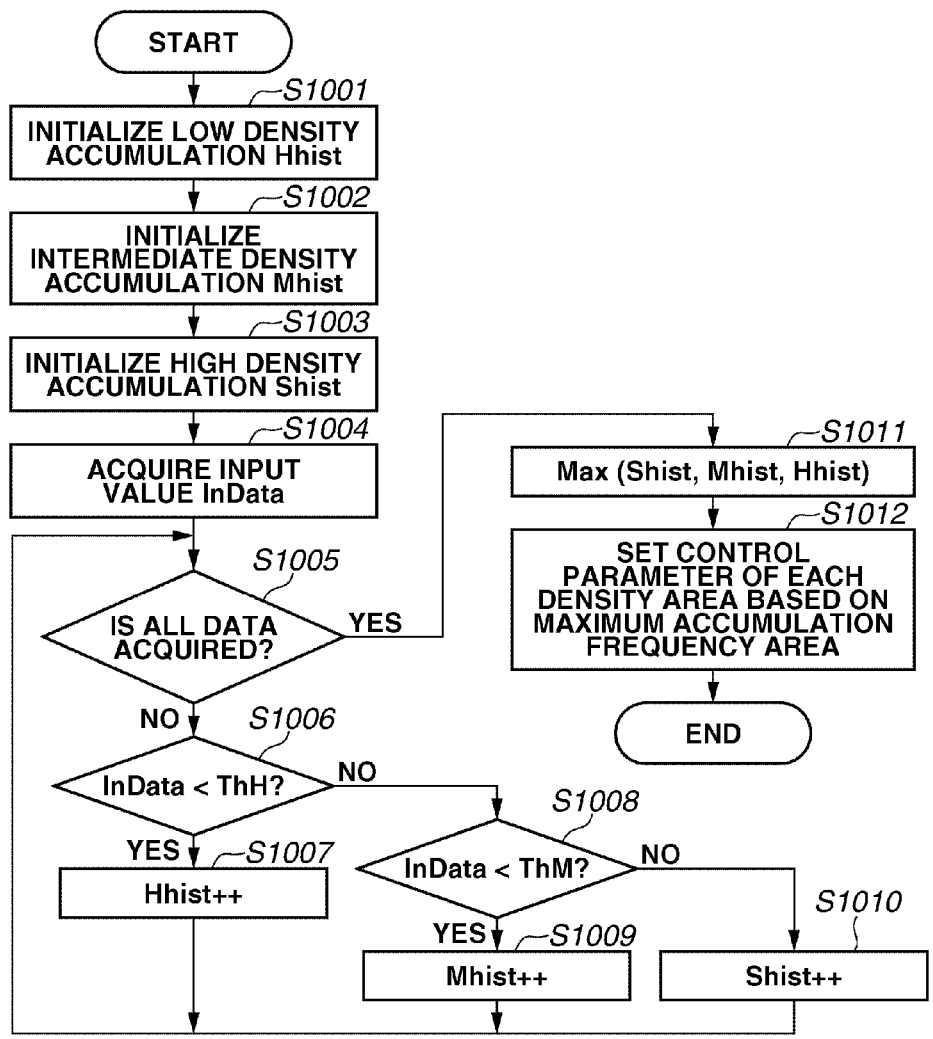
FIG. 10 is a flow chart illustrating an outline of an operation for a density adjustment according to a second exemplary embodiment.

FIG. 10 is a flow chart illustrating the outline of the operation for the density adjustment. A control program for realizing the processing illustrated in FIG. 10 is stored in the ROM 103 as described above. Loading the control program stored in the ROM 103 on the RAM 102 and the CPU 101 executing the loaded program execute the processing illustrated in the flow chart in FIG. 10.

In steps S1001 to S1003, a low density accumulation Hhist, an intermediate density accumulation Mhist, and a high density accumulation Shist are initialized.

Then, in step S1004, an input value InData is acquired. In step S1005, the CPU 101 determines whether all data pieces are acquired.

If the CPU 101 determines whether all data pieces are not acquired (NO in step S1005), in step S1006, the low density accumulation determination threshold ThH is acquired from the HDD 104 and compared with the input value InData.

If the CPU 101 determines that the input value InData is smaller than the low density accumulation determination threshold ThH (YES in step S1006), in step S1007, the low density accumulation Hhist is incremented, and the processing returns to step S1005.

On the other hand, if the CPU 101 determines that the input value InData is larger than the low density accumulation determination threshold ThH (NO in step S1006), in step S1008, the intermediate density accumulation determination threshold ThM is acquired from the HDD 104 and compared with the input value InData.

If the CPU 101 determines that the input value InData is smaller than the intermediate density accumulation determination threshold ThM (YES in step S1008), in step S1009, the intermediate density accumulation Mhist is incremented, and the processing returns to step S1005.

On the other hand, if the CPU 101 determines that the input value InData is larger than the intermediate density accumulation determination threshold ThM (NO in step S1008), in step S1010, the high density accumulation Shist is incremented, and the processing returns to step S1005.

If the CPU 101 determines whether all data pieces are acquired (YES in step S1005), in step S1011, a maximum accumulation frequency area corresponding to the maximum value of the low density accumulation Hhist, the intermediate density accumulation Mhist, and the high density accumulation Shist is acquired.

In step S1012, the presence or absence of an overlap of each density area is set based on the maximum accumulation frequency area acquired in step S1011 and the processing is ended.

FIG. 11A illustrates the presence or absence of an overlap of each density area in the present exemplary embodiment. A parameter 1101 is set in step S1012 in FIG. 10. FIG. 11B illustrates accumulation frequency in each input signal including a low density accumulation Hhist 1103, an intermediate density accumulation Mhist 1104, and a high density accumulation Shist 1105. In the case of an input data 1102, the maximum accumulation frequency area acquired in step S1011 is the low density accumulation Hhist. As a result, setting is performed in which the low density area is not overlapped, the intermediate density is not overlapped, and the high density area is overlapped using the parameter 1101 and the correction table is generated.

Figure 12A:
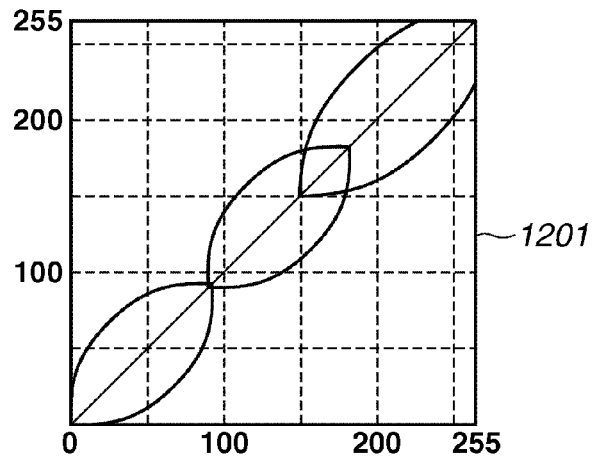
FIGS. 12A, 12B, and 12C illustrate examples of correction tables generated by adjusting density according to the second exemplary embodiment.
Figure 12B:
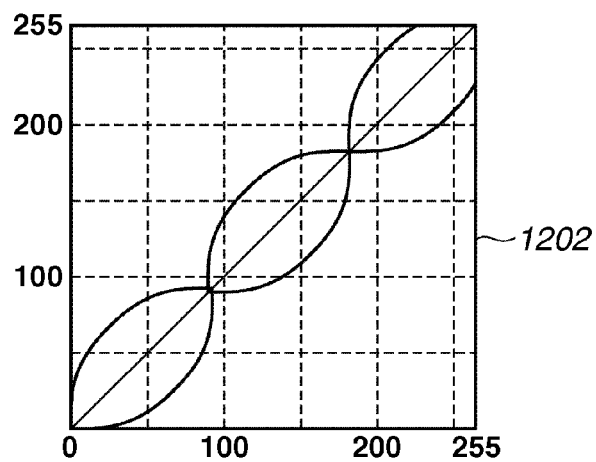
Figure 12C:
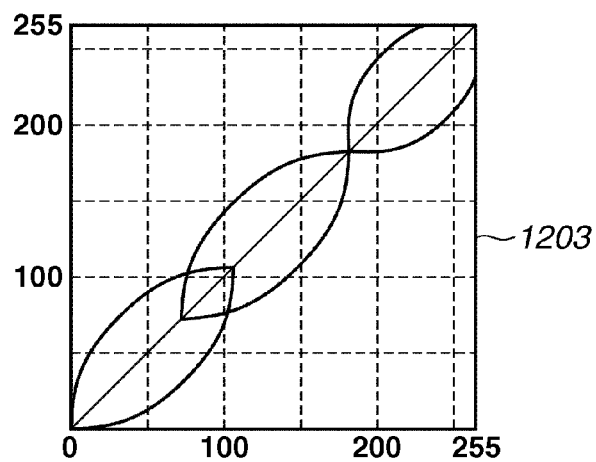

FIGS. 12A to 12C illustrate examples of the actually generated correction tables. FIG. 12A illustrates an example of the correction table generated when the maximum accumulation frequency area acquired in step S1011 is the low density accumulation Hhist. In the example, three upper convex curves in the low density area H, the intermediate density M, and the high density area S are respectively set to +8. Three lower convex curves in the low density area H, the intermediate density M, and the high density area S are respectively set to −8.

Similarly, FIG. 12B illustrates an example of the correction table generated when the maximum accumulation frequency area acquired in step S1011 is the intermediate density accumulation Mhist. FIG. 12C illustrates an example of the correction table generated when the maximum accumulation frequency area acquired in step S1011 is high density accumulation Shist.

Therefore, the correction table in FIG. 12A is set to the correction table of the input data illustrated in FIG. 11B.

The above-described processing can perform the density adjustment in which the correction method of the adjacent density area is determined from the accumulation frequency of the input data when independently performing the density adjustment processing on a plurality of density areas of input digital image data. Accordingly, the processing enables the inhibition of the density inversion and the maintenance of the gradation depending on the density area of the input data.

A third exemplary embodiment describes the case where a method for correcting the adjacent density area in performing the density adjustment processing is controlled based on input data frequency included in the density inversion area.

The processing similar to that in the first exemplary embodiment is given the same reference character and numeral to omit the description thereof. The following is described on the assumption that a parameter accumulation determination threshold Thd in the method for correcting the adjacent density area is stored in the HDD 104.

Figure 13:
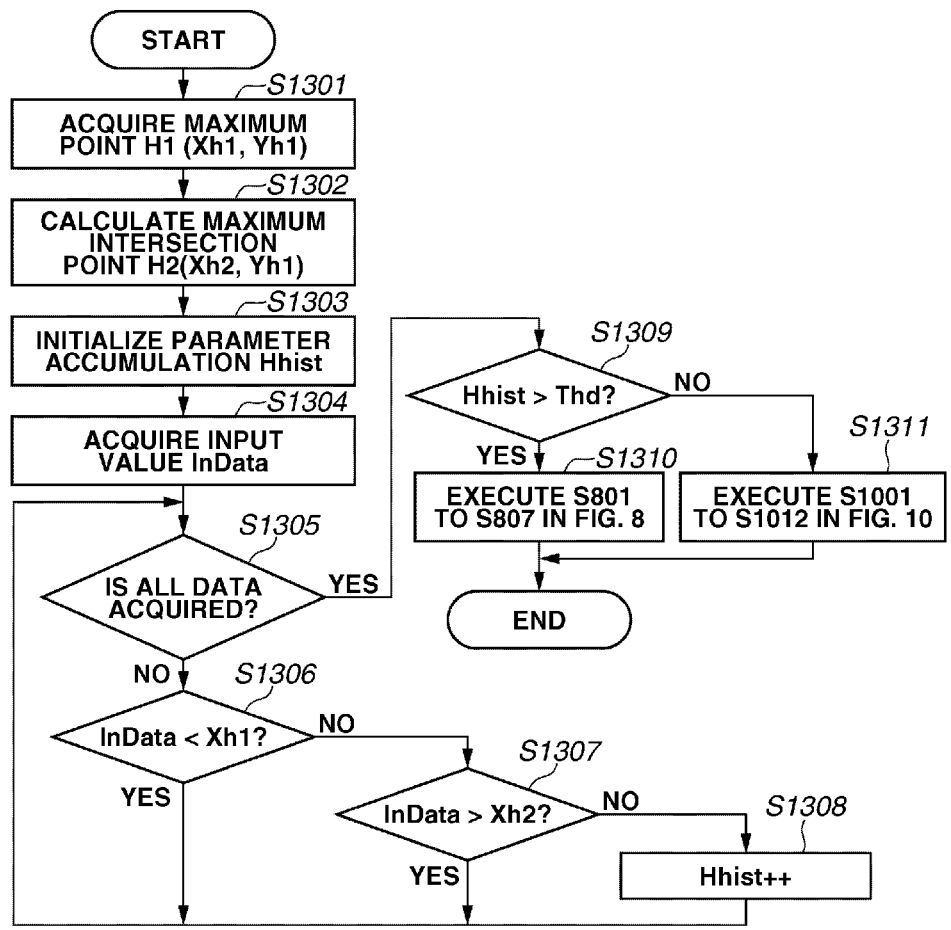
FIG. 13 is a flow chart illustrating an outline of an operation for a density adjustment according to a third exemplary embodiment.

FIG. 13 is a flow chart illustrating the outline of the operation for the density adjustment. A control program for realizing the processing illustrated in FIG. 13 is stored in the ROM 103 as described above. Loading the control program stored in the ROM 103 on the RAM 102 and the CPU 101 executing the loaded program execute the processing illustrated in the flow chart in FIG. 13.

In step S1301, a maximum point H1 (Xh1, Yh1) in the correction table generated in step S505 in FIG. 5 is acquired. In step S1302, a maximum intersection point H2 (Xh2, Yh1) indicating the same output value as the maximum point H1 (Xh1, Yh1) is calculated to determine an inversion area Xh1–Xh2.

In step S1303, a parameter accumulation Hist is initialized. In step S1304, an input value InData is acquired. In step S1305, the CPU 101 determines whether all data pieces are acquired.

If the CPU 101 determines that all data pieces are not acquired (NO in step S1305), in step S1306, the input value Xh1 of the maximum point H1 acquired in step S1301 is compared with the input value InData.

If the CPU 101 determines that the input value InData is larger than the input value Xh1 of the maximum point H1 (NO in step S1306), in step S1307, the input value Xh2 of the maximum intersection point H2 acquired in step S1302 is compared with the input value InData.

If the CPU 101 determines that the input value InData is smaller than the input value Xh2 of the maximum intersection point H2 (NO in step S1307), in step S1308, the parameter accumulation Hist is incremented and the processing returns to step S1305.

On the other hand, if the CPU 101 determines that the input value InData is larger than the input value Xh2 of the maximum intersection point H2 (YES in step S1307), the processing returns to step S1305.

On the other hand, if the CPU 101 determines that the input value InData is smaller than the input value Xh1 of the maximum point H1 (YES in step S1306), the processing returns to step S1305.

On the other hand, if the CPU 101 determines that all data pieces are acquired (YES in step S1305), in step S1309, the parameter accumulation determination threshold Thd is acquired from the HDD 104 and compared with the parameter accumulation Hist.

If the CPU 101 determines that the parameter accumulation Hist is larger than the parameter accumulation determination threshold Thd (YES in step S1309), in step S1310, the CPU 101 executes the processing in steps S801 to S807 illustrated in FIG. 8 to perform the inversion correction processing and the processing is ended.

on the other hand, if the CPU 101 determines that the parameter accumulation Hist is smaller than the parameter accumulation determination threshold Thd (NO in step S1309), in step S1311, the CPU 101 executes the processing in steps S1001 to S1012 illustrated in FIG. 10 and the processing is ended.

The above-described processing allows controlling the method for generating the correction table described in the first and second exemplary embodiments according to the accumulation frequency of the input data included in the density determination area by the method for correcting the adjacent density area of the input digital image data. Accordingly, the processing enables the inhibition of the density inversion and the maintenance of the gradation depending on the density area of the input data.

A fourth exemplary embodiment describes a method for controlling display of the operation unit in the density adjustment processing.

The processing similar to that in the first exemplary embodiment is given the same reference character and numeral to omit the description thereof. In the present exemplary embodiment, an adjustment setting value by density area can be selected from 17 stages of −8 to +8 and the present exemplary embodiment is described on the basis of the setting of the low density area adjustment value H.

FIG. 14A is a flow chart illustrating the outline of the operation for the density adjustment. A control program for realizing the processing illustrated in FIG. 14A is stored in the ROM 103 as described above. Loading the control program stored in the ROM 103 on the RAM 102 and the CPU 101 executing the loaded program execute the processing illustrated in the flow chart in FIG. 14A.

In step S1401, a density adjustment menu is selected in the operation unit 13. In step S1402, the CPU 101 determines whether the adjustment by density area is set.

If the CPU 101 determines that the adjustment by density area is set (YES in step S1402), in step S1403, an adjustment color set by the operation unit 13 is acquired.

In step S1404, a low density area adjustment value H (an adjustment value of a first density area) set by the operation unit 13 is acquired. In step S1405, an intermediate density area adjustment value M (an adjustment value of a second density area adjacent to the first density area) is set to −8.

In step S1406, the CPU 101 determines whether the intermediate density area adjustment value M set in step S1405 is larger than 8.

If the CPU 101 determines that the intermediate density area adjustment value M is smaller than 8 (NO, in step S1406), in step S1407, the adjustment values fH, fM, and fS corresponding to the adjustment amount by density area are multiplied by the modulation amounts illustrated in FIG. 4 to generate the correction table (correction characteristics).

In step S1408, the CPU 101 determines whether data is inversed in the correction table generated in step S1407. If the CPU 101 determines that data is inversed in the correction table (YES in step S1408), in step S1409, the intermediate density area adjustment value M is incremented, and the processing returns to step S1406.

If the CPU 101 determines that data is not inversed in the correction table (NO in step S1408), in step S1410, Enable setting is performed in which the operation unit 13 enables setting the intermediate density area adjustment value M or higher, and the processing is ended.

If the CPU 101 determines that the intermediate density area adjustment value M is larger than 8 (YES, in step S1406), the processing proceeds to step S1410. If the CPU 101 determines that the adjustment by density area is not set (NO in step S1402), the processing is ended.

Similarly, the high density area adjustment value S can be controlled by repeating the above-described processing in steps S1404 to S1410.

Figure 15:
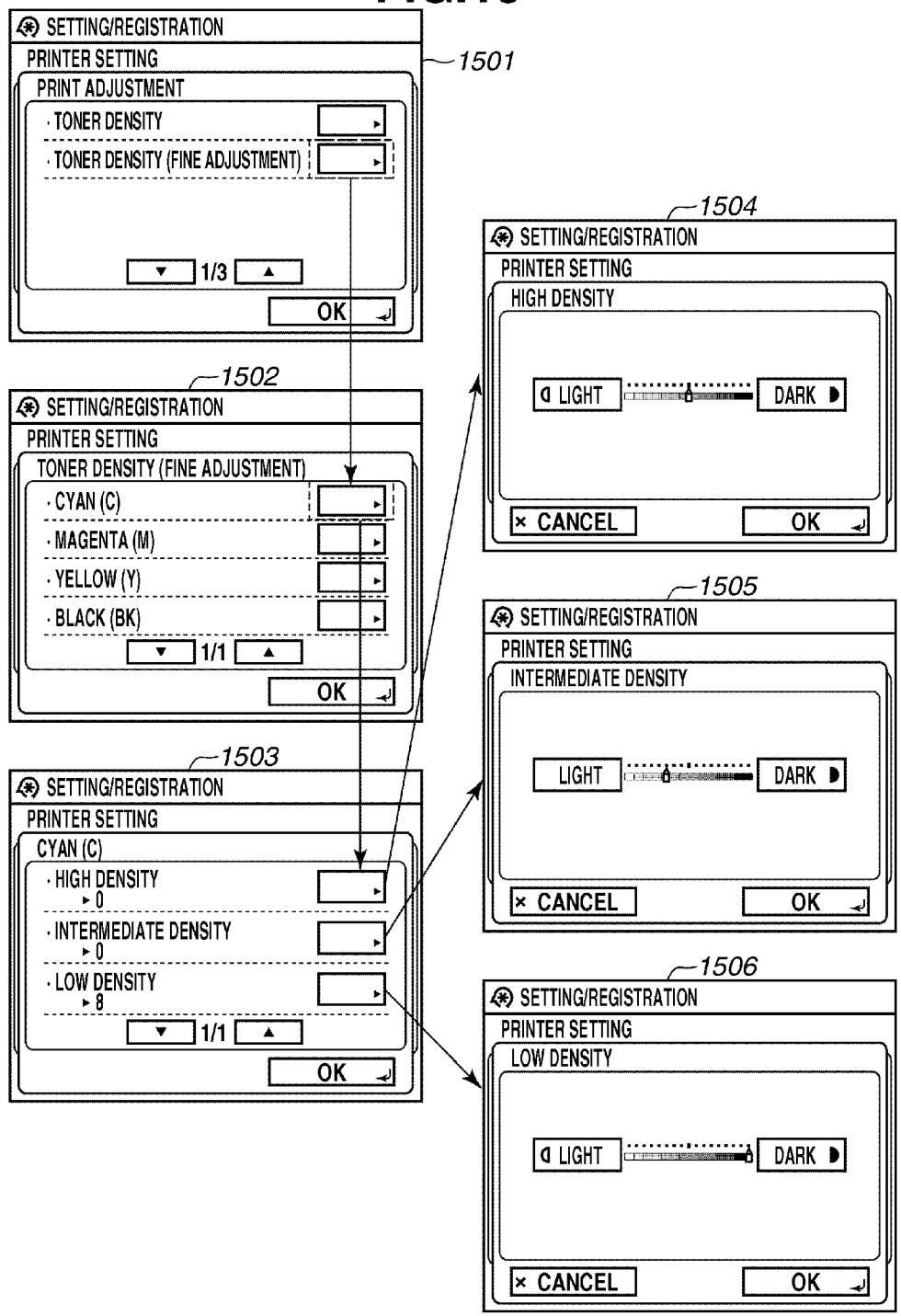
FIG. 15 illustrates an example in which the adjustment amount by density area is set on the operation unit according to the fourth exemplary embodiment.

FIG. 15 is a schematic diagram illustrating an example of the adjustment amount by density area on the operation unit 13.

FIG. 15 illustrates a density adjustment menu setting screen 1501 in step S1401 in FIG. 14A, an adjustment setting screen by density area 1502 in step S1402 in FIG. 14A, and an adjustment color acquisition screen 1503 in step S1403 in FIG. 14A. A screen 1505 is a screen in which the intermediate density area adjustment value M or higher in step S1410 in FIG. 14A is set to Enable setting (which cannot be instructed). For example, as illustrated in the adjustment color acquisition screen 1503, if an adjustment amount by density area is set to +8 in the low density H, the screen 1505 indicates that the CPU 101 determines that data is inversed in step S1408 illustrated in FIG. 14A in the intermediate density M of −8 to −5 in the intermediate density adjustment setting screen 1505.

The above-described processing allows controlling the density adjustment processing via the display of the operation unit when a plurality of density areas of the input digital image data is independently subjected to the density adjustment processing. Accordingly, the processing enables the inhibition of the density inversion depending on the density area of the input data.

The fourth exemplary embodiment describes the density adjustment processing is controlled via the display of the operation unit. A fifth exemplary embodiment describes the change of parameters of setting values displayed on the operation unit.

The processing similar to that in the fourth exemplary embodiment is given the same reference character and numeral to omit the description thereof. In the present exemplary embodiment, an adjustment setting value by density area can be selected from 17 stages of −8 to +8 illustrated in FIG. 7, and the present exemplary embodiment is described on the basis of the setting of the low density area adjustment value H.

Figure 14B:
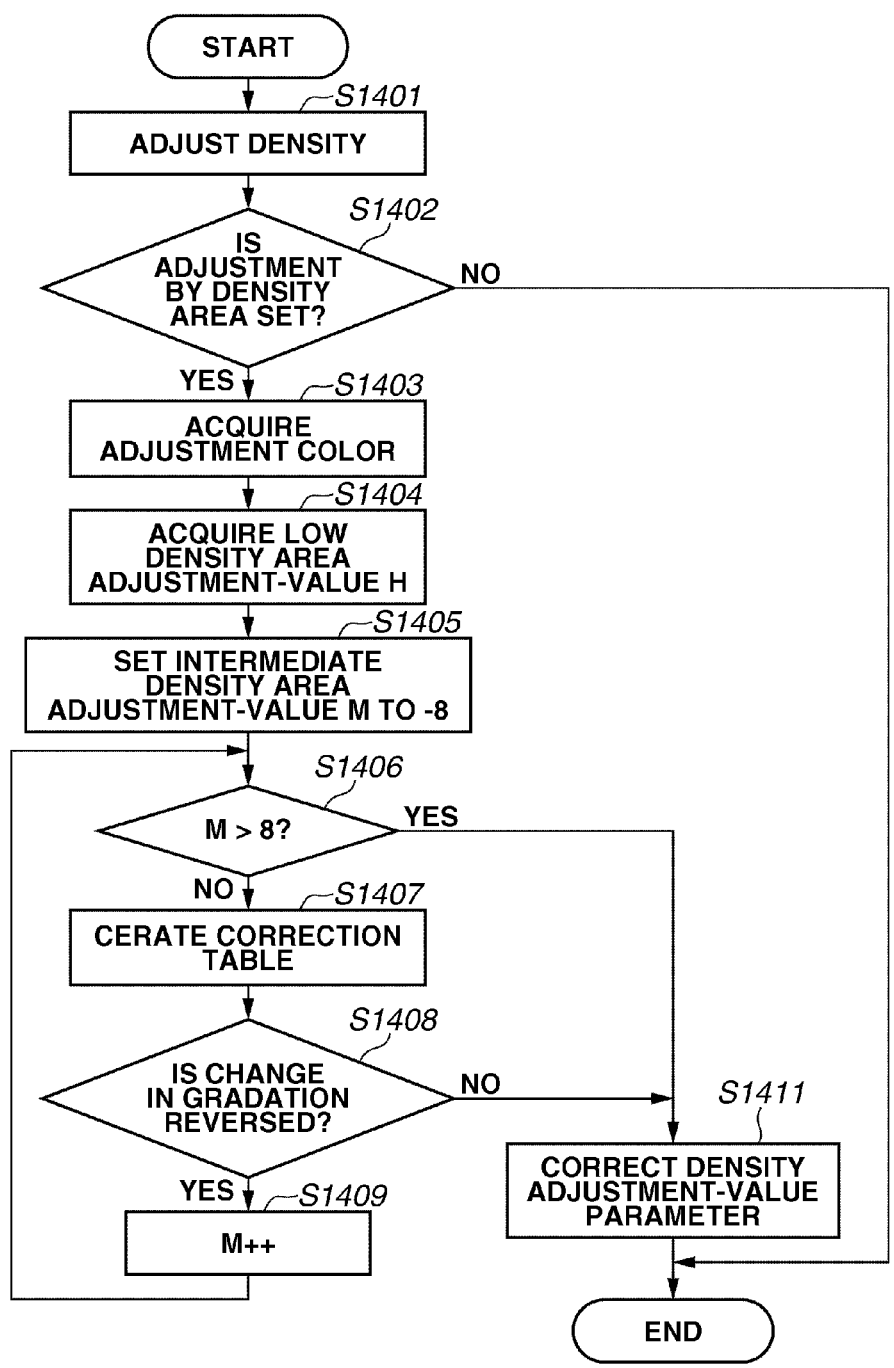

FIG. 14B is a flow chart illustrating the outline of the operation for the density adjustment. A control program for realizing the processing illustrated in FIG. 14B is stored in the ROM 103 as described above. Loading the control program stored in the ROM 103 on the RAM 102 and the CPU 101 executing the loaded program execute the processing illustrated in the flow chart in FIG. 14B.

The processing in steps S1401 to S1409 in FIG. 14B are similar to the ones in the fourth exemplary embodiment, so that the description thereof is omitted.

In step S1408, if the CPU 101 determines that data is not inversed in the correction table (NO in step S1408), in step S1411, a density adjustment parameter of the intermediate density area adjustment value M is corrected and the processing is ended. In step S1406, if the CPU 101 determines that the intermediate density area adjustment value M is larger than 8 (YES, in step S1406), the processing proceeds to step S1411.

Similarly, the high density area adjustment value S can be controlled by repeating the above-described processing in steps S1404 to S1411.

[Detailed Operation for Correcting Density Adjustment Parameter]

Figure 16:
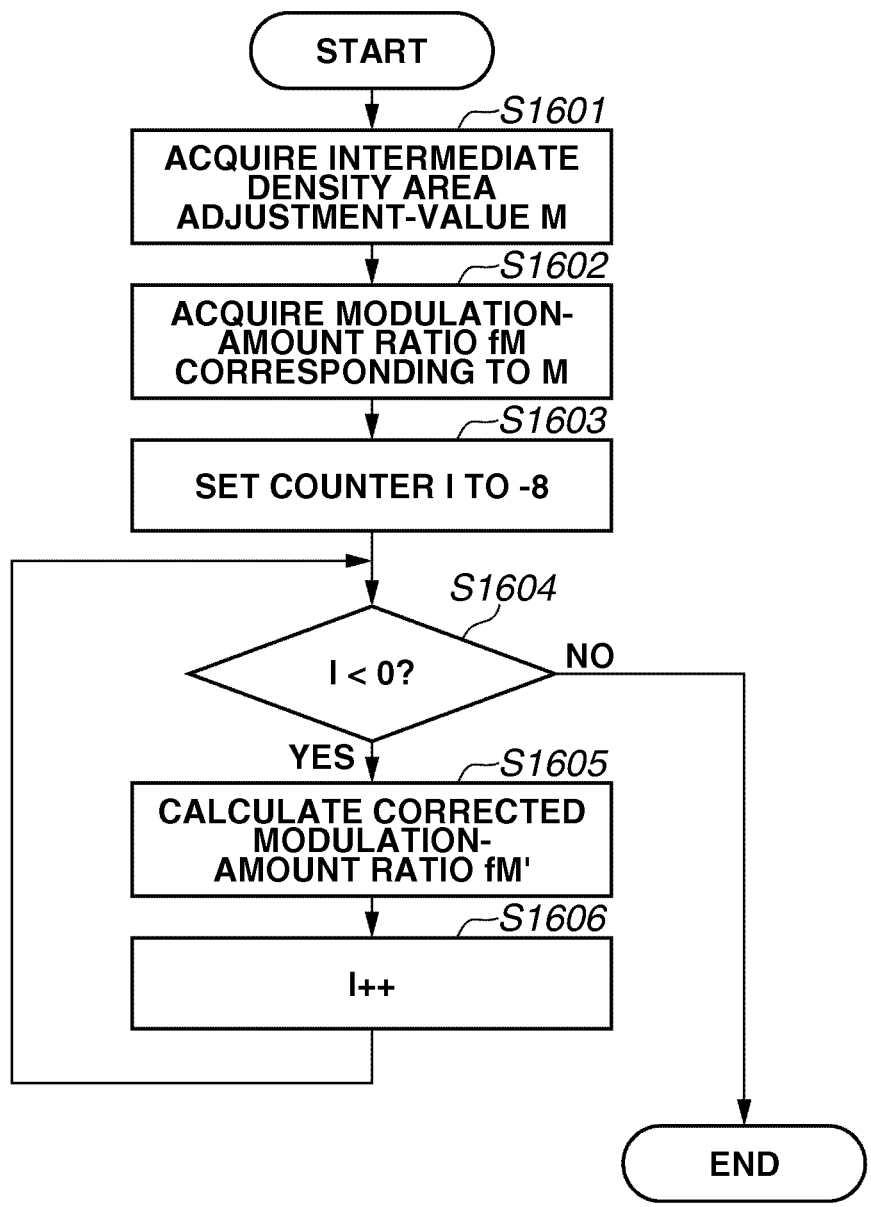
FIG. 16 is a flow chart illustrating an outline of an operation for correcting density adjustment parameters according to the fifth exemplary embodiment.

FIG. 16 is a flow chart illustrating the outline of the operation for correcting the density adjustment parameter in step S1411 in FIG. 14B. A control program for realizing the processing illustrated in FIG. 16 is stored in the ROM 103 as described above. Loading the control program stored in the ROM 103 on the RAM 102 and the CPU 101 executing the loaded program execute the processing illustrated in the flow chart in FIG. 16.

The following is described on the assumption that a counter "i" is stored in the HDD 104. The operation is described using the density adjustment parameter illustrated in FIG. 7 as an example.

In step S1601, the intermediate density area adjustment value M determined in step S1406 or step S1408 in FIG. 14B. In step S1602, the adjustment value fM corresponding to the intermediate density area adjustment value M is acquired.

In step S1603, the counter "i" is initialized to −8. In step S1604, the CPU 101 determines whether the counter "i" is smaller than 0.

If the CPU 101 determines that the counter "i" is smaller than 0 (YES in step S1604), in step S1605, a corrected modulation amount ratio fM' is calculated by the following equation.

$$fM'(i)=\text{INT}(\text{ABS}(fM(i))/8\times i+0.5) \quad (6)$$

where, fM(i) is an adjustment value in the counter "i," fM'(i) is a corrected adjustment value in the counter "i," ABS( ) is an absolute value, and INT( ) is an integer value.

In step S1606, the counter "i" is incremented, then the processing returns to step S1604.

In step S1604, if the CPU 101 determines whether the counter "i" is equal to or larger than 0 (NO in step S1604), the processing is ended.

Similarly, the high density area adjustment value S can be controlled by repeating the above-described processing in steps S1601 to S1606.

FIG. 17 is a table illustrating a relationship between the adjustment amount by density area displayed on the operation unit 13 and the adjustment values fH, fM, and fS corresponding thereto based on the result in which a modulation amount ratio corrected in the operation in FIG. 16 is applied to the adjustment value in FIG. 7 in a case where the intermediate density area adjustment value M is −5.

The above-described processing allows changing the parameter of the setting value displayed on the operation unit when a plurality of density areas of the input digital image data is independently subjected to the density adjustment processing. Accordingly, the processing enables the inhibition of the density inversion depending on the density area of the input data.

Aspects of the present invention can also be realized by a computer of a system or apparatus (or devices such as a CPU, a micro processing unit (MPU), and/or the like) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., a non-transitory computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-118139 filed May 26, 2011, which is hereby incorporated by reference herein in its entirety.

What is claimed is:

1. An image processing apparatus capable of independently performing a density adjustment on a plurality of density areas,
wherein the plurality of density areas is overlapped with an adjacent density area,
the image processing apparatus comprising:
an input unit configured to independently input an adjustment value to the plurality of density areas;
a generation unit configured to generate a correction characteristic based on the adjustment values according to the plurality of density areas;
a correction unit configured to correct the correction characteristic to monotonously increase an inversion section of the correction characteristic in a case where a change in a gradation is inversed in the generated correction characteristic, so that the inversion section of the correction characteristic is monotonously increased based on maximum, minimum, and middle points in the generated correction characteristic; and
a density adjustment unit configured to perform density adjustment on image data based on the corrected correction characteristic.

2. The image processing apparatus according to claim 1, wherein the correction unit calculates the maximum point and the minimum point of the correction characteristic in a case where a change in a gradation is inversed in the generated correction characteristic, calculates the middle point between the calculated maximum and minimum points, and corrects the correction characteristic so that the inversion section of the correction characteristic is monotonously increased based on the maximum, minimum, and middle points.

3. The image processing apparatus according to claim 2, wherein the correction unit calculates a point on the correction characteristic being a Y coordinate of the calculated maximum point and a point on the correction characteristic being a Y coordinate of the calculated minimum point, and corrects the correction characteristic so that the inversion section of the correction characteristic is monotonously increased based on the two calculated points on the correction characteristic and the middle point.

4. An image processing apparatus capable of independently performing a density adjustment on a plurality of density areas,
wherein the plurality of density areas is overlapped with an adjacent density area,
the image processing apparatus comprising:
an input unit configured to independently input an adjustment value to the plurality of density areas,
wherein the input unit is limited in a setting range of an adjustment value in a second density area adjacent to a first density area based on an adjustment value according to the first density area among the plurality of density areas, and
a setting range of an adjustment value in the second density area is limited so as not to cause an inversion of a change in a gradation of a correction characteristic generated based on the first and second density areas,
wherein, when an inversion of a change in a gradation of the correction characteristic occurs, an inversion section of the correction characteristic is monotonously increased based on maximum, minimum, and middle points in the generated correction characteristic to correct the correction characteristic.

5. A method for executing image processing capable of independently performing a density adjustment on a plurality of density areas,
wherein the plurality of density areas is overlapped with an adjacent density area,
the method comprising:
independently inputting an adjustment value to the plurality of density areas;
generating a correction characteristic based on the adjustment values according to the plurality of density areas;
correcting the correction characteristic to monotonously increase an inversion section of the correction characteristic in a case where a change in a gradation is inversed in the generated correction characteristic, so that the inversion section of the correction characteristic is monotonously increased based on calculated maximum, minimum, and middle points in the generated correction characteristic; and
performing density adjustment on image data based on the corrected correction characteristic.

6. A method for executing image processing capable of independently performing a density adjustment on a plurality of density areas,
wherein the plurality of density areas is overlapped with an adjacent density area,
the method comprising:
independently inputting an adjustment value to the plurality of density areas,
wherein the input is limited in a setting range of an adjustment value in a second density area adjacent to a first density area based on an adjustment value according to the first density area among the plurality of density areas, and
a setting range of an adjustment value in the second density area is limited so as not to cause an inversion of a change in a gradation of a correction characteristic generated based on the first and second density areas,
wherein, when an inversion of a change in a gradation of the correction characteristic occurs, an inversion section of the correction characteristic is monotonously increased based on maximum, minimum, and middle points in the generated correction characteristic to correct the correction characteristic.

7. A non-transitory computer-readable medium storing a program for causing a computer to execute a method comprising:
independently inputting an adjustment value to a plurality of density areas;
generating a correction characteristic based on the adjustment values according to the plurality of density areas;
correcting the correction characteristic to monotonously increase an inversion section of the correction characteristic in a case where a change in a gradation is inversed in the generated correction characteristic, so that the inversion section of the correction characteristic is monotonously increased based on maximum, minimum, and middle points in the generated correction characteristic; and
performing density adjustment on image data based on the corrected correction characteristic.

* * * * *